US007537171B2

(12) United States Patent
Mueller et al.

(10) Patent No.: US 7,537,171 B2
(45) Date of Patent: May 26, 2009

(54) THERMOSTAT CONTROL SYSTEM PROVIDING POWER SAVING TRANSMISSIONS

(75) Inventors: Carl J. Mueller, St. Louis, MO (US); Bartholomew L. Toth, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 637 days.

(21) Appl. No.: 10/990,897

(22) Filed: Nov. 17, 2004

(65) Prior Publication Data

US 2006/0102731 A1    May 18, 2006

(51) Int. Cl.
*G05D 23/00* (2006.01)
*G08B 17/00* (2006.01)
*G08C 17/00* (2006.01)
*H01Q 11/12* (2006.01)
*H04B 1/16* (2006.01)
*H04B 1/38* (2006.01)

(52) U.S. Cl. .......................... 236/51; 340/584; 370/311; 455/127.1; 455/127; 455/2; 455/127.3; 455/127.4; 455/127.5; 455/343.1; 455/343.2; 455/343.3; 455/343.4; 455/343.5; 455/571; 455/572; 455/574

(58) Field of Classification Search .................. 236/51; 340/584; 370/311; 455/127.1–127.5, 343.1–343.5, 455/571, 572, 574

See application file for complete search history.

(56) References Cited

U.S. PATENT DOCUMENTS

| 3,883,368 | A | * | 5/1975 | Kordesch et al. ............... 429/9 |
| 5,390,206 | A | | 2/1995 | Rein et al. |
| 5,595,342 | A | | 1/1997 | McNair et al. |
| 5,596,313 | A | * | 1/1997 | Berglund et al. ............ 340/574 |
| 5,711,480 | A | | 1/1998 | Zepke et al. |
| 5,927,599 | A | | 7/1999 | Kath |
| 6,213,404 | B1 | * | 4/2001 | Dushane et al. ............... 236/51 |
| 6,453,689 | B2 | * | 9/2002 | Wada .......................... 62/175 |
| 6,513,723 | B1 | * | 2/2003 | Mueller et al. ............ 236/46 R |
| 2003/0228890 | A1 | * | 12/2003 | Falaki ........................ 455/574 |

\* cited by examiner

*Primary Examiner*—Frantz F Jules
*Assistant Examiner*—Azim Rahim
(74) *Attorney, Agent, or Firm*—Harness, Dickey & Pierce, P.L.C.

(57) ABSTRACT

A thermostat control system having remote devices and/or other internally powered devices provides transmissions at different power levels and at different data transfer rates to conserve power life. Thermostat control system components and devices may be powered by replaceable power supplies that are conserved by transmitting at a lower power level more often than at a higher power level. A higher power level transmission is provided at a lower data transfer rate, and a lower power level transmission is provided at a higher data transfer rate. A higher power transmission is provided periodically to ensure reliable communication of temperature information.

20 Claims, 4 Drawing Sheets

THERMOSTAT CONTROL SYSTEM PROVIDING POWER SAVING TRANSMISSIONS

FIELD OF THE INVENTION

The present invention relates generally to climate control systems, and more particularly to a thermostat control system for controlling transmission power between thermostat control system devices, including remote units.

BACKGROUND OF THE INVENTION

Thermostat control systems typically include a thermostat unit for sensing climate conditions (e.g., temperature) and controlling an associated Heating Ventilating and Air Conditioning (HVAC) system. Multiple thermostat units may be provided with each controlling a separate climate zone using a single HVAC system or separate HVAC systems. For example, a separate thermostat unit may be provided on each floor of a home for separately controlling (i.e., monitoring and activating) the heating and cooling on each floor (usually, but not necessarily) using separate heating and air conditioning units.

Even with multiple thermostat units or separate climate zones, maintaining a comfortable temperature level in different portions of a building during different times of day is very difficult. A programmable thermostat unit may be used to provide additional climate control (e.g., different set point temperatures during different time periods). However, it is still difficult to achieve comfortable climate levels in different rooms throughout the day because of changes in internal home environment conditions that are typically hard to predict and control (e.g., opening and closing blinds in different rooms and/or opening and closing various external doors).

Oftentimes the thermostat unit is installed in a location (e.g., kitchen hallway) that is not desirable for temperature measurements relative to other rooms in a building (e.g., a house). Also, individuals in a house usually occupy different rooms at different times of the day. Thus, the thermostat unit fails to accommodate the climate control needs of occupants at various times of the day. Further, outdoor conditions, including for example, the angle of the sun, may affect internal house temperature in different rooms. This further increases the problem of maintaining comfortable climate levels in different rooms of a house throughout the day.

Attempts to address these problems and maintain better climate control within a building include providing wired and remote temperature sensor devices in rooms separate from the main thermostat unit. These sensors typically provide temperature and other climate information to the thermostat unit for use in controlling an associated HVAC system based upon transmitted climate condition information from the sensors in specific rooms. Thus, depending upon which room of the house is most often used during a particular time period, the thermostat may be programmed to use the transmitted sensed temperature information from the sensor in that particular room to activate cooling and/or heating. The thermostat unit may be configured for processing sensed transmitted climate conditions from more than one remote sensor to thereby control an HVAC system to heat and/or cool a building. Such a thermostat unit is the 1F95-479 model thermostat, manufactured and sold by the White-Rodgers Division of Emerson Electric Co.

Remote sensors are usually more desirable than wired sensors because of the ease of installation (i.e., no hard wiring required). However, remote sensors are typically powered by replaceable internal power supplies (e.g., batteries), making power conservation (i.e., reducing power consumption and usage) a larger concern. Conserving power is also a concern in battery powered thermostat units. For example, if a climate control system is replaced, with the associated thermostat unit also replaced, additional sources of power (e.g., an internal power supply) for the thermostat unit may be required to control the new system, such as when replacing a single stage system with a multi-stage system.

Systems and devices are known that attempt to conserve or save power in order to extend the life of the replaceable power supplies within specific devices of a thermostat control system. Some of these systems transmit only at lower power levels, which may result in a failure to provide reliable transmissions depending upon the distance between the thermostat unit and sensors, as well as other interference. In other known systems, the number of transmissions from a remote sensor may be reduced, for example, by transmitting temperature information only after a predetermined time period. Although this may conserve power, unnecessary transmissions can occur during extended periods in which temperature variations do not exceed a fraction of a degree in temperature. For example, if the temperature in a house remains relatively constant at 70 degrees for a two hour period, a sensor that transmits on a periodic basis would waste power transmitting the same temperature value to the thermostat, which would accordingly hold the heating and cooling systems in an off state.

Still other systems include devices having different types of low-power transmitters, which are typically costly, and again may fail to provide reliable transmissions. With such a system, multiple sensors or transmitting units may be required to transmit sensed temperature information from the remote sensing unit to the main thermostat unit located a distance from the remote sensor (i.e., transmit from one unit to the next).

Therefore, these known systems and devices fail to provide power saving transmissions (i.e., reduction in power consumption) while ensuring reliable and timely sensed climate information. This can result in unacceptable temperature levels. Further, these systems and devices are generally costly to manufacture.

SUMMARY OF THE INVENTION

The present invention provides a low-cost system and method for reducing power consumption in climate control systems having remote and/or other internally powered components, while maintaining reliability in transmissions. Generally, transmissions are provided at one of two power levels, with climate control data or information transmitted at one of two different data transfer rates (i.e., data transmission speeds).

Specifically, a transmitting device (e.g. a transmitter or transceiver) and corresponding receiving device (e.g., receiver or transceiver) are configured for communicating at different power levels and data transfer rates. A thermostat control system is provided that transmits and receives climate information preferably using radio frequency (RF) signals at the different power levels and data transfer rates. The transmitter and receiver may be provided separately in different system components. For example, a transmitter constructed according to the present invention may be provided in a remote sensor, with a receiver constructed according to the present invention adapted to receive transmissions from the transmitter provided in a thermostat unit, or vice versa. However, a transmitter and receiver may be provided in both the thermostat unit and each remote sensor, and may be implemented either as separate component parts or as a single unit (e.g., a transceiver). A transceiver allows for bidirectional communication between the thermostat unit and the remote sensors.

Specifically, a transmitting device of the present invention within, for example, a thermostat unit or remote sensor powered by an internal replaceable power supply (e.g., batteries), preferably transmits a lower power signal more frequently than a higher power signal. For example, if the remote sensor transmits only on a sensed temperature change of more than a predetermined amount, the remote sensor may transmit multiple times at the lower power level followed by a single higher power level transmission. Preferably, a higher power level transmission may occur at a predetermined time interval to ensure that a corresponding receiving device receives at least this higher power transmission (e.g., every thirty minutes if no higher power level transmission occurs). Thus, if multiple lower power level transmissions occur between higher power transmissions, but are not received by a corresponding receiving device because of interference (e.g., electrical noise), the periodic higher power transmissions ensure that, for example, the thermostat unit receives climate control information at least once during a predetermined time period. Reliability of climate information is thereby maintained during normal operation of the thermostat control system.

To further ensure the reliability of transmissions and extend power supply life, the higher power level transmission is preferably provided at a lower data transfer rate and the lower power transmission is preferably provided at higher data transfer rate. If lower power level transmissions are not reliably received by a receiving device of the present invention, a transmitting device of the present invention may be configured to transmit only at a higher power level. This provides the user with time to select a new location for the transmitting device while maintaining reliable transmissions until a new location is selected.

In operation in connection with a thermostat control system, a setup or learn mode and a normal operating mode are preferably provided. During the setup or learn mode, remote sensors may be adjusted (i.e., relocated) depending upon the thermostat unit requirements. For example, the placement of remote sensor units may be changed to maximize or optimize transmission signal reception strength (ensure low power level transmissions are received). The signal reception strength may be displayed on the thermostat unit as a signal strength indicator for each remote sensor. Each sensor comprises a device serial number unique to the particular sensor. During the setup or learn mode, each sensor is prompted to transmit a "flag" within the transmission signal that provides a unique identification of the serial number of the sensor, which is used by the thermostat's transceiver unit later to recognize a signal from that sensor. Therefore, during the normal operating mode, the transceiver unit will only recognize signals that include the serial numbers of the sensors that were identified and saved during the set-up mode, and will ignore any signals from other nearby sensors in neighboring households. The thermostat can also distinguish between transmissions from multiple remote sensors in the same household. During the set-up mode, the user may assign each sensor with a designation, such as the letters A, B, C etc. that is included in the transmission signal, so that the user can relate the temperature displayed on the thermostat for sensor "A" with the room that sensor "A" is in, and likewise for sensors B, C, etc.

Thus, the present invention provides a system and method for use with climate control systems having remote components and other internally powered devices, to extend the power supply life of these components, while ensuring reliability in transmission. Control of transmissions between system components is provided using different power levels in combination with different data transfer rates.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the transmitting and receiving devices of the present invention as disclosed herein is generally discussed in relation to a particular climate control system, having specific component parts (e.g., remote sensors), it is not so limited, and any type of climate control system wherein remote transmissions are provided and/or that have components using replaceable power supplies may incorporate the transmitting and receiving devices according to the principles of the present invention.

The present invention provides for conserving power in a thermostat control system using power saving transmissions. However, before further describing the invention, it is useful to understand a system within which the present invention may be implemented. In particular, this may be further understood with respect to the climate control system shown by example in FIGS. 1 and 2, and the thermostat unit and remote sensor shown by example in FIGS. 3 and 4.

Figure 1:
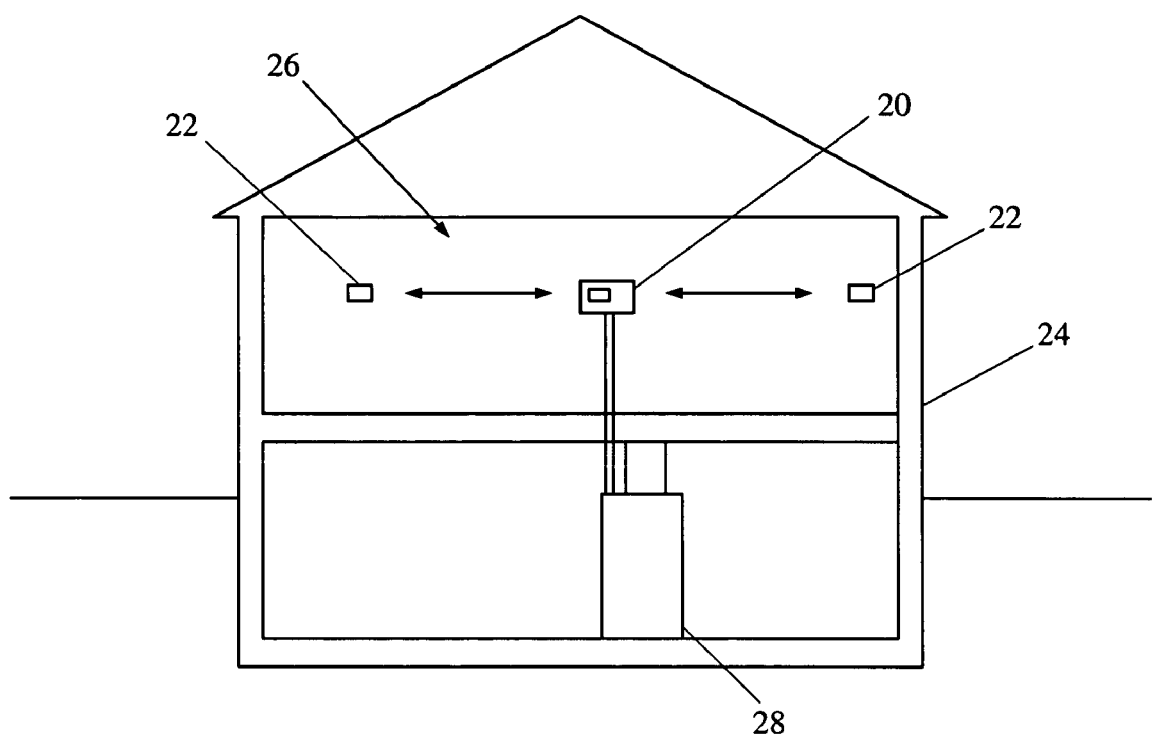
FIG. 1 is a building floor plan showing a preferred embodiment of a climate control system in which a transmitter and receiver constructed according to the principles of the present invention may be implemented.

A preferred embodiment of a climate control system including a thermostat control system having remote internally powered components is shown generally in FIG. 1. The thermostat control system having remote components typically includes a thermostat unit 20 that may be in communication with a plurality of sensors, such as remote sensors 22. As shown therein, the remote sensors 22 may be provided in different rooms of a building 24 (e.g., a residential house) for sensing climate conditions in those rooms and transmitting information relating to the climate conditions to the thermostat unit 20. The climate information may include, for example, the sensed temperature or temperature change, the measured humidity and identification information (e.g., device type ID, unique sensor ID and/or channel number) uniquely identifying the particular remote sensor 22. Bi-directional communication may also be provided, such that the remote sensors 22 may be configured for receiving control information from the thermostat unit 20. One particular remote climate control system for use with the present invention includes the 1F95-479 thermostat and F0148-1328 remote sensor, both manufactured and sold by the White-Rodgers Division of Emerson Electric Co.

It should be noted that more than one thermostat unit 20 may be provided within the building 24 and/or a plurality of remote sensors 22 may be provided on different floors or levels of the building 24. Each remote sensor 22 is preferably configured for use with a specific thermostat unit 20, with the thermostat unit 20 recognizing transmissions from each remote sensor 22 associated therewith as described herein. Also, information may be transmitted from the remote sensors 22 to the thermostat unit 20 or from the thermostat unit 20 to the remote sensors 22, depending upon climate control system requirements.

With respect generally to a climate control system 26, and more particularly to one having remote components with internal power sources in which the present invention may be implemented, a thermostat unit 20 communicates wirelessly with a plurality of remote sensors 22 to determine climate conditions, as shown in FIG. 1. The thermostat unit 20 processes the climate condition information and controls (e.g., starts heating or cooling cycle) an HVAC system 28 based upon predetermined system settings (e.g., user programmed set-point temperatures stored in a digital programmable thermostat unit 20). It should be noted that the thermostat unit 20 may be provided with a local sensor (not shown) for sensing climate conditions near the thermostat unit 20. The thermostat unit 20 may also process information from the local sensor, in addition to the sensors 22 to control the HVAC system 28.

Figure 2:
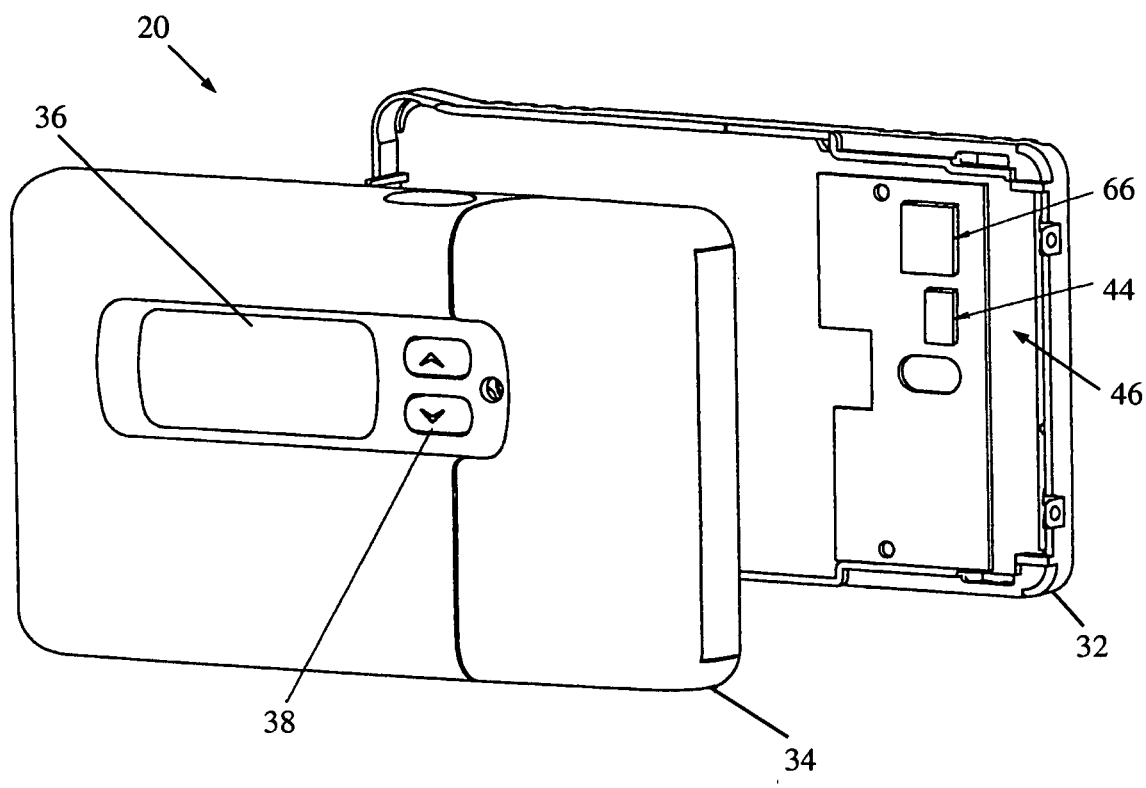
FIG. 2 is a perspective view of a preferred embodiment of a thermostat unit having a receiving device constructed according to the principles of the present invention therein.

As shown in FIG. 2, a thermostat unit 20 in which the present invention may be implemented includes a base 32 and a removable face or cover 34 adapted for connection to the base 32. The removable face or cover 34 may include an opening 36 for viewing a liquid crystal display used for programming the thermostat unit 20 and obtaining climate control information (e.g., current temperature, set-point temperature, etc.). Buttons 38 provide for programming the thermostat unit 20 (e.g., selecting the set-point temperature).

The thermostat unit 20 may be provided with an internal compartment (not shown) or similar member having a replaceable power supply (i.e., depletable), which preferably comprises a plurality of batteries (e.g., two AA batteries) for powering components within the thermostat unit 20. The internal replaceable power supply may be utilized when power is temporarily unavailable from an external power source (e.g., main power to thermostat unit 20 fails) to preserve the system or programmed settings of the thermostat unit 20. An example of such a thermostat unit 20 in which the present invention may be implemented is the 1F95 Series thermostat manufactured and sold by the White-Rodgers Division of Emerson Electric Co.

The internal replaceable power supply may also be used when external power to the thermostat unit 20 is permanently unavailable, such as in a retrofit installation with power to internal components provided by the internal replaceable power supply (e.g., when replacing a single stage system with a multi-stage system having a multi-stage thermostat requiring more than one power source). An example of such a thermostat unit 20 in which the present invention may be implemented is the 1F95 Series thermostat manufactured and sold by the White-Rodgers Division of Emerson Electric Co.

With respect to powering the thermostat unit 20, power may be needed for a microprocessor 44 or a receiver 46 provided in accordance with the present invention. It should be noted that power for the microprocessor 44 and receiver 46 may be provided from an external source connected directly to the thermostat unit 20. Further, the thermostat unit 20 preferably includes a controller as part of the microprocessor 44 for controlling operation of the thermostat unit 20 (e.g., activating cooling and/or heating).

Figure 3:
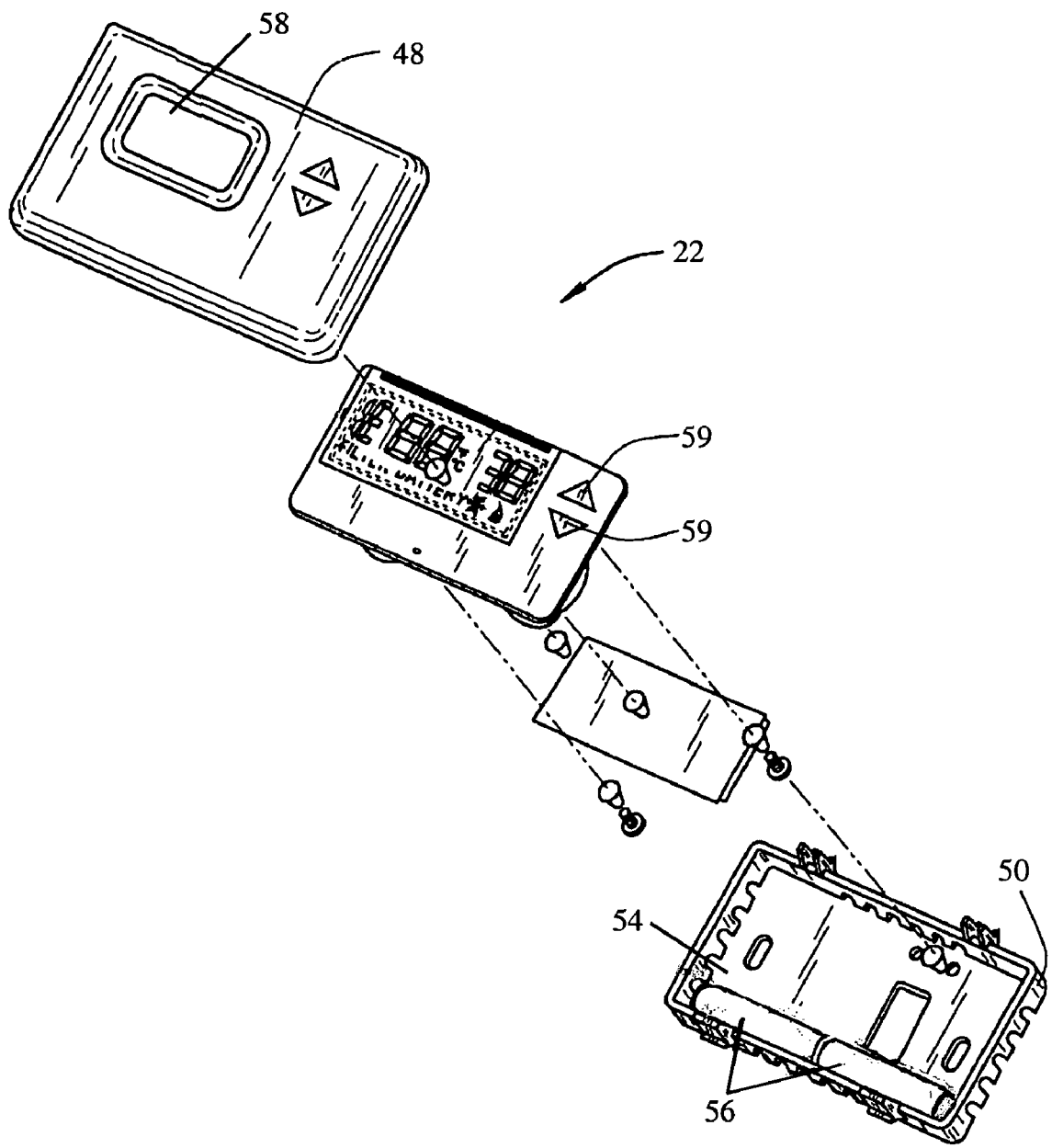
FIG. 3 is a perspective view of a preferred embodiment of a remote sensor having a transmitting device constructed according to the principles of the present invention therein.

As shown in FIG. 3, a remote sensor 22 in which the present invention may be implemented includes a removable face or cover 48 adapted for connection to a base 50. An opening 58 may be provided in the face or cover 48 for viewing a liquid crystal display. The liquid crystal display may provide system and/or climate control information (e.g., current sensed temperature). Buttons 59 are preferably provided for use in obtaining information from and programming the remote sensor 22.

The remote sensor 22 is powered by an internal replaceable power supply 56 (i.e., depletable), shown as replaceable batteries (e.g., two AAA batteries), which are provided within an internal compartment 54. Components within the remote sensor 22 preferably include a temperature sensor 60 (eg. temperature sensor circuit), which may be provided in any known manner, and a transmitter 62 adapted for communication with the receiver 46 in accordance with the present invention, and as described herein. It should be noted that the remote sensor 22 alternately may be powered by an external power supply. An example of such a remote sensor 22 in which the present invention may be implemented is the F0145-1328 remote temperature sensor.

In addition to the receiver 46 in the thermostat unit 20, a transmitter 62 may be provided therewith. Further, in addition to the transmitter 62 in the remote sensor 22, a receiver 46 may be provided therewith. The transmitter 62 and receiver 46 may be provided as a single unit (e.g., a transceiver). The transceiver unit 70 of the thermostat 20 comprises an antenna 64, a transceiver chip 66, and a processor 68. The transceiver chip 66 receives signals from the antenna, and compares the signal to a reference signal. For example, in the preferred embodiment, the signal is compared to a local oscillator having a frequency of 418 Mhz, and is demodulated into a digital data stream. This data is output through a communication link to the processor 68, which loads the data into a software buffer for protocol verification. The processor 68 strips the data and analyzes the synchronization bit at the beginning of the signal to synchronize the transmitted signal and the transceiver chip 66, and also analyzes the unique serial number within the transmission to verify the signal protocol with stored sensor serial numbers. When protocol verification of the transmitted signal is completed and the signal verified to be valid, the received data stream is transferred from the processor 68 to the thermostat's microprocessor 44 using synchronized serial communication. The transmitted information is not identified or stored by the processor 68, but rather by the thermostat's microprocessor 44. The microprocessor 44 of the thermostat receives the transmitted data and identifies the sensor letter designation A, B, C etc., to uniquely identify and store the data pertaining to the appropriate sensor unit.

Having described one type of climate control system 26 with a thermostat control system including various component devices (i.e., thermostat unit 20 and remote sensors 22) in which the present invention may be implemented, in accordance with a preferred embodiment of a transceiver unit 70 of the present invention, communication is provided at different transmission levels. Specifically, the transmitter in the temperature sensor 22 is adapted to transmit climate and control information to the transceiver 66 at a plurality of power levels, and preferably at one of two power levels as follows: (1) a lower power level or (2) a higher power level. Preferably, during normal operation as described herein, the temperature sensor transmitter transmits at a lower power level more frequently than at a higher power level. The transmitted signal is preferably configured as a carrier present/carrier absent continuous Surface Acoustic Wave (SAW) type of transmission.

The temperature sensor transmitter is preferably also adapted for transmitting the climate and control information to the transceiver 70 at a plurality of data transfer rates, and more preferably at one of two transfer rates as follows: (1) a lower transfer rate of preferably about 2000 bits per second (bps); or (2) a higher transfer rate of preferably about 4000 bps. More preferably, the lower power transmission is provided at the higher data transfer rate and the higher power transmission is provided at the lower data transfer rate. However, in some embodiments this can also be reversed so that at the lower power the transmission is at the lower data transfer rate, and at higher power the transmission is at the higher data transfer rate. The base frequency of the transmitter may be configured as required, and for residential uses, may be provided at about 418 MHz.

The transmitter in the temperature sensor for transmitting climate or control information at one of two power levels and one of two data transfer rates may be provided by a programmable transmitter chip, such as, for example, a Chipcon Chip #CC1070 manufactured and sold by Chipcon. The transceiver chip 66 for receiving climate or control information at one of two power levels and one of two data transfer rates from the transmitter may be provided, for example, by a Chipcon #CC1020 sold and manufactured by Chipcon. It should be noted that if the transmitter is adapted for transmitting at a frequency at which the transceiver is not adapted to receive, the received signal is preferably frequency shifted in a known manner. Further, depending upon the transmission requirements of the particular thermostat control system, a different transmitter or receiver may be provided having different power levels and data transfer rates.

In a more preferred operation, a remote sensor 22 is activated in a setup or learn mode upon installation. In this mode of operation, the transmitter 62 preferably transmits at predetermined time intervals (e.g., every eleven seconds) a lower power/higher data transfer rate test signal for reception by a receiver 46 or transceiver 70 in a thermostat unit 20 that is also activated in a setup or learn mode. The test signal preferably includes a leader to indicate the transfer rate of the signal, which will be included with transmissions during the normal operating mode, and also includes a "flag" or a serial number identification of the particular sensor unit, for use by the thermostat's transceiver unit 46' in identifying future transmissions from the specific remote sensor 22 during the normal operating mode. The sensor 22 also prompts the user to assign each sensor with a designation letter A, B, C etc. that is included in the transmission signal, so that the user can relate the temperature displayed on the thermostat for sensor "A" with the room that sensor "A" is in, and likewise for sensors B, C, etc.

The thermostat unit 20 may be provided with a visual indicator to show the strength of the signal received from the remote sensor 22 in the setup or learn mode in order to determine whether the remote sensor 22 should be installed in a different location to provide better signal transmission strength. An example of such a thermostat unit 20 in which the present invention may be implemented is the 1F95-479 Series thermostat manufactured and sold by the White-Rodgers Division of Emerson Electric Co. Alternately, if the remote sensor 22 is installed in a location providing weak transmissions to the thermostat unit 20, and the user does not desire to move the remote sensor 22, the transmitter 62 is adapted to transmit once at a higher power/lower data transfer rate after a predetermined number of transmissions. This will ensure at least one transmission is reliably received in a given number of successive transmissions. It should be noted that the frequency of higher power/lower data rate transmissions may alternatively be based on a time period, and is preferably any suitable means for providing a frequency of reliable higher power transmissions.

With respect to determining signal strength, and for example, one or more light emitting diodes (LEDs) 70 (e.g., a tricolored LED of three single colored LEDs) may be provided in connection with the thermostat unit 20 to preferably indicate signal strength as follows: (1) green indicates strong signal strength; (2) yellow indicates adequate signal strength and the user should consider moving the remote sensor 22 or setting the transmitter 62 to a higher power level only mode; or (3) red indicates unacceptable signal strength requiring moving the remote sensor 22 or setting the transmitter 62 to a higher power level only mode. It should be noted that the setup or learn mode is activated for each remote sensor 22 that will transmit data to the thermostat unit 20 during the normal operating mode.

After completion of the setup or learn mode the remote sensor 22 and thermostat unit 20 are returned to a normal operating mode. If in the normal operating mode a user determines that the thermostat unit 20 is not properly controlling climate conditions, such as, for example, if a room having a remote sensor 22 therein becomes too warm, this may indicate that signal strength has become weak. The weak signal strength may result from, for example, an electronic device that may have been moved in close proximity to the remote sensor 22 and is causing interference. In such a case, the remote sensor 22 and thermostat unit 20 may again be placed in the setup or learn mode in order to identify a better location for the remote sensor 22 or to select a higher power level only transmission mode for operation.

In the normal operating mode (i.e., remote sensor 22 set to transmit at lower power/higher transfer rate more frequently), the transmitter preferably periodically transmits climate and control information to the receiver or transceiver of the thermostat 20. In this mode, the temperature sensor transmitter preferably transmits only on a sensed temperature change of a predetermined amount.

Figure 4:
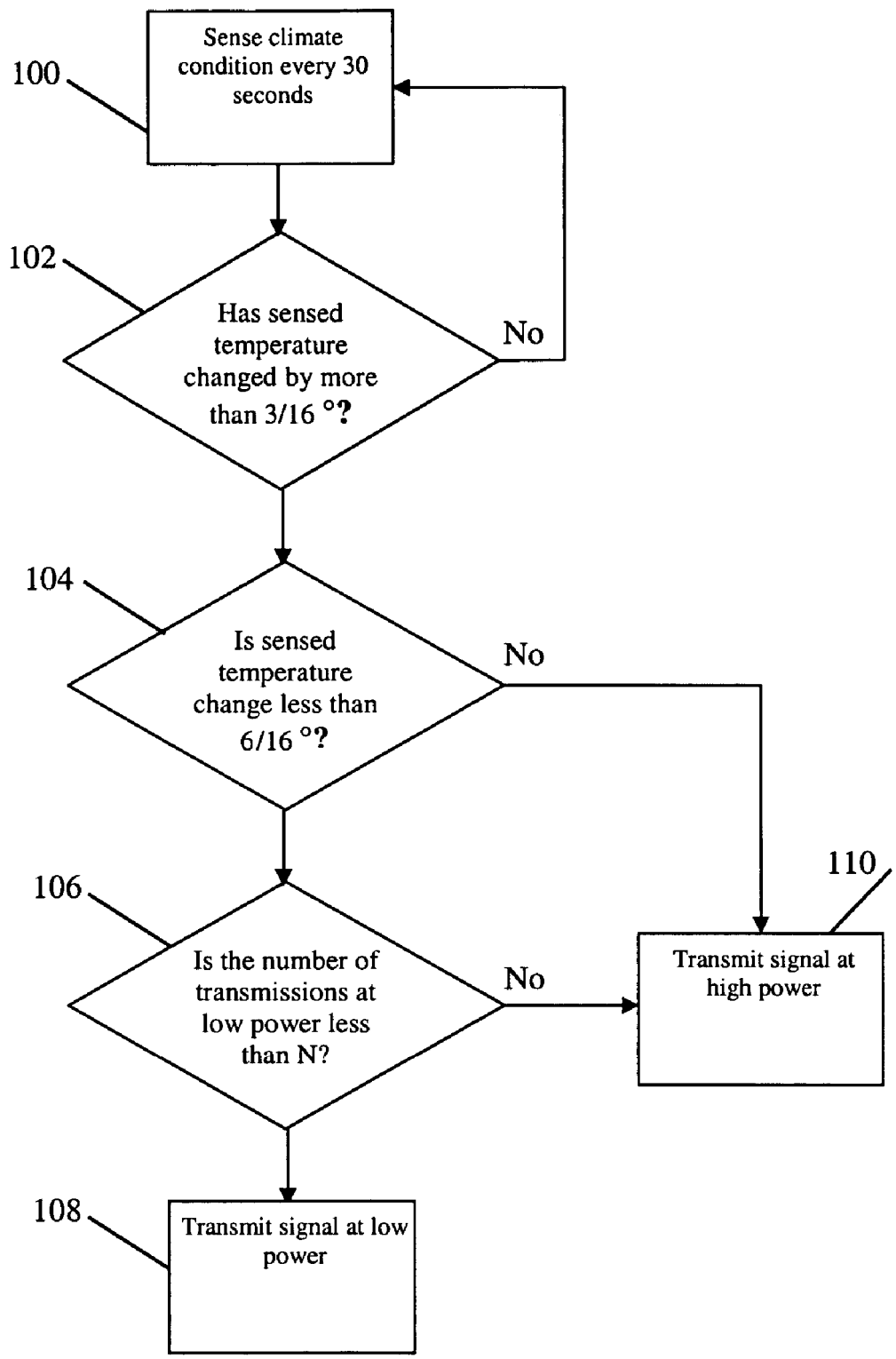
FIG. 4 is a flow chart showing a preferred embodiment of a process for controlling transmission power according to the present invention.

With respect specifically to controlling transmission levels and providing power saving transmissions according to the present invention, and as shown in FIG. 4, in a more preferred normal operating mode, the remote sensors 22 sense climate conditions at step 100 at predetermined time intervals. For example, sensing may occur every 30 seconds. Upon sensing a change in climate conditions (e.g., temperature change) that exceeds a predetermined amount (e.g., 3/16° F. temperature change in the normal transmission mode or 6/16° F. temperature change in the higher power level only transmission mode) at steps 102 and 104, the transmitter transmits a lower power/higher data transfer rate signal to the thermostat transceiver or receiver at 108, unless a predetermined number of transmissions (e.g., 10 transmissions) since the last higher power/lower data transfer rate transmission has been exceeded at step 106. If the predetermined number of transmissions has occurred, a higher power/lower data transfer rate signal is transmitted at 110. If the sensed temperature does not exceed the predetermined temperature change amount, the sensors 22 continue to sense climate conditions at 100 to obtain climate information for use in the next transmission.

It should be noted that the sensors 22 may be configured to sense temperature conditions at, for example, random time intervals, fixed time intervals, or a time intervals dependent upon a variable number or value (e.g., last sensed temperature value) at 100.

Although the present invention has been described in connection with specific devices in a thermostat control system as part of a climate control system 26, including a thermostat unit 20 and remote sensors 22, it should be appreciated that different or additional components may be provided as part of the climate control system 26. This may include different thermostat units and sensing devices. Further, a different transmitter may be provided for transmitting a Surface Acoustic Wave carrier present/carrier absent signal, a different type of signal or a different type of carrier wave. Further, more than two power levels and two data transfer rates may be provided in connection with the present invention. Also, transmissions between the various devices of the thermostat control system may be modified, including the time periods and conditions for transmitting information.

The description of the invention is merely exemplary in nature and, thus, variations that do not depart from the gist of the invention are intended to be within the scope of the invention. Such variations are not to be regarded as a departure from the spirit and scope of the invention as claimed.

What is claimed is:

1. An improved thermostat control system having one or more battery powered wireless remote temperature sensors, the improvement comprising:
   one or more remote temperature sensors that are capable of sensing temperature, said sensors having transmitters that transmit signals at a lower power level and a higher power level, said signals comprising temperature information and a unique identification code and user-assigned code associated with each of the one or more remote temperature sensors, the one or more remote sensors controlling said transmitter to successively alternate between transmitting a high power transmission signal and transmitting a set of low power transmission signals, followed by transmitting another high power transmission signal and transmitting a set of low power transmission signals, in continuous succession such that the transmitter transmits at least a predetermined number of signals at the lower power level for every signal transmitted at the higher power level, to thereby ensure at least one transmission at a high power transmission level is reliably received in a given number of successive transmissions, whereby the one or more remote sensors transmit signals only when the sensed temperature changes by more than a predetermined amount such that battery consumption is reduced;
   a processor for controlling the operation of the thermostat;
   a receiver means within the thermostat for receiving and identifying transmitted signals that comprise a unique identification code, the receiver means being configured to communicate to the processor only those signals that comprise one of a select set of unique identification codes, and
   wherein the processor stores the transmitted temperature information associated with the user-assigned code that identifies each remote sensor among one or more remote temperature sensors, for use in controlling the operation of the thermostat.

2. The improved thermostat control system of claim 1, wherein the predetermined amount of change in temperature is in the range of $3/16$ to $1/2$ of a degree Farenheit.

3. An improved thermostat control system having one or more battery powered wireless remote temperature sensors, the improvement comprising:
   one or more remote temperature sensors that are capable of sensing temperature, said sensors having transmitters that transmit signals at a lower power level and a higher power level, said signals comprising temperature information and a unique identification code and user-assigned code associated with each of the one or more remote temperature sensors, the one or more remote sensors controlling said transmitter to successively alternate between transmitting a high power transmission signal and transmitting a set of low power transmission signals, followed by transmitting another high power transmission signal and transmitting a set of low power transmission signals, in continuous succession such that the transmitter transmits at least a predetermined number of signals at the lower power level for every signal transmitted at the higher power level, to thereby ensure at least one transmission at a high power transmission level is reliably received in a given number of successive transmissions, whereby the one or more remote sensors transmit signals only when the sensed temperature changes by more than a predetermined amount such that battery consumption is reduced;
   a processor for controlling the operation of the thermostat;
   a receiver means within the thermostat for receiving and identifying transmitted signals that comprise a unique identification code, the receiver means being configured to communicate to the processor only those signals that comprise one of a select set of unique identification codes, wherein the remote sensor is configured to transmit the temperature information at a first data transfer rate and a second data transfer rate, and the receiving device is configured to receive the temperature information at the first data transfer rate and second data transfer rate.

4. The improved thermostat control system of claim 3 wherein the remote sensor is configured to transmit at the lower power level more frequently than at the higher power level.

5. The improved thermostat control system of claim 4 wherein the remote sensor is configured to transmit at the ratio of at least one signal at the higher power level for every ten signals transmitted at the low power level.

6. The improved thermostat control system of claim 3 wherein the first data transfer rate is lower transfer rate and the second data transfer rate is a higher transfer rate, and the transmitter is adapted to transmit at the lower data transfer rate during the higher power level transmission and at the higher data transfer rate during the lower power level transmission.

7. The improved thermostat control system of claim 1 wherein the thermostat is configured to display the sensed temperature that corresponds to each of the one or more remote temperature sensors.

8. The improved thermostat control system of claim 7 wherein the user-assigned code comprises an alpha-numeric character for labeling the one or more remote temperature sensors.

9. The improved thermostat control system of claim 8 wherein the user-assigned code comprises text for labeling the location of the one or more remote temperature sensors.

10. The improved thermostat control system of claim 1, further comprising a display means for displaying a signal strength level indicator for each remote sensor signal received by the processor, wherein the user may verify reception of a transmitted signal from each remote sensor.

11. The improved thermostat control system of claim 10, wherein the remote sensor transmitted signal further comprises humidity information.

12. The improved thermostat control system of claim 11, wherein the receiver means is a transceiver that is capable of receiving and transmitting wireless signals.

13. The improved thermostat control system of claim 12 wherein the remote sensor and receiving device are configured for radio frequency transmissions.

14. The improved thermostat control system of claim 13, wherein the remote sensor signals are transmitted at a frequency of about 418 Mhz.

15. The improved thermostat control system of claim 14 wherein the remote sensor and receiving device are configured for radio frequency transmissions.

16. A thermostat control system having one or more battery powered wireless remote temperature sensors, the thermostat control system comprising:
one or more remote temperature sensors that are configured to sense temperature, each of said transmitters including a transmitter that transmits signals at both a lower power level and a higher power level, said signals comprising temperature information, the one or more remote sensors controlling said transmitter to successively alternate between transmitting a high power transmission signal and transmitting a set of low power transmission signals, followed by transmitting another high power transmission signal and transmitting a set of low power transmission signals, in continuous succession such that the transmitter transmits at least a predetermined number of signals at the lower power level for every signal transmitted at the higher power level, to thereby ensure at least one transmission at a high power transmission level is reliably received in a given number of successive transmissions;
a processor for controlling the operation of the thermostat;
a receiver means within the thermostat for receiving and identifying the transmitted signals, wherein the processor stores the transmitted temperature information for use in controlling the operation of the thermostat.

17. The thermostat control system of claim 16 wherein the one or more remote sensors are configured to transmit at the ratio of at least one signal at the higher power level for every ten signals transmitted at the low power level.

18. A thermostat control system having one or more battery powered wireless remote temperature sensors, the thermostat control system comprising:
one or more remote temperature sensors that are configured to sense temperature, each of said transmitters including a transmitter that transmits signals at both a lower power level and a higher power level, said signals comprising temperature information, the one or more remote sensors controlling said transmitter to successively alternate between transmitting a high power transmission signal and transmitting at least ten low power transmission signals, followed by transmitting another high power transmission signal and transmitting at least ten low power transmission signals, in continuous succession, such that the transmitter transmits a greater ratio of signals at the lower power level than signals transmitted at the higher power level;
a processor for controlling the operation of the thermostat;
a receiver means within the thermostat for receiving and identifying the transmitted signals, wherein the processor stores the transmitted temperature information for use in controlling the operation of the thermostat, wherein the one or more remote sensors are configured to transmit the temperature information at a higher data transfer rate for signals transmitted at the lower power level, and at a lower data transfer rate for signals transmitted at the higher power level.

19. The thermostat control system of claim 18, wherein the one or more remote sensors are configured to transmit signals only when the sensed temperature changes by more than a predetermined amount such that battery consumption is reduced.

20. The thermostat control system of claim 19, wherein the predetermined amount of change in temperature is in the range of $3/16$ to $1/2$ of a degree Farenheit.

* * * * *